June 7, 1932. A. L. KRONQUEST 1,861,536
MACHINE FOR APPLYING SOLDER TO KEYS FOR OPENING CONTAINERS
Filed July 14, 1930 4 Sheets-Sheet 3

Inventor
ALFRED L. KRONQUEST.

By Sturtevant, Mason & Porter
Attorneys.

June 7, 1932. A. L. KRONQUEST 1,861,536
MACHINE FOR APPLYING SOLDER TO KEYS FOR OPENING CONTAINERS
Filed July 14, 1930 4 Sheets-Sheet 4

Inventor
ALFRED L. KRONQUEST.
By
Sturtevant, Mason & Porter
Attorneys.

Patented June 7, 1932

1,861,536

UNITED STATES PATENT OFFICE

ALFRED L. KRONQUEST, OF SYRACUSE, NEW YORK, ASSIGNOR TO CONTINENTAL CAN COMPANY, INC., OF NEW YORK, N. Y., A CORPORATION OF NEW YORK

MACHINE FOR APPLYING SOLDER TO KEYS FOR OPENING CONTAINERS

Application filed July 14, 1930. Serial No. 467,916.

The invention relates to new and useful improvements in a machine for applying solder to a key used in connection with a rip strip container.

An object of the invention is to provide a machine for automatically receiving keys one after another for applying solder to the keys and for automatically discharging the keys on to a stacking rail after the solder has been applied thereto.

A further object of the invention is to provide a machine of the above type wherein the keys are automatically placed on travelling carriers which suspend the keys by engagement with the loop thereof, and wherein means is associated with the carriers so that the keys are caused by gravity to engage a bath of solder for applying solder to the tip end of the key.

A further object of the invention is to provide a machine of the above type wherein each carrier is provided with a depending member having a laterally projecting finger which is adapted to enter the loop of the key and wherein means is associated with the carriers so as to turn the same for presenting said laterally projecting finger in a forward direction for loading and in a rearward direction for unloading.

These and other objects will in part be obvious and will in part be hereinafter more fully disclosed.

In the drawings which show by way of illustration one embodiment of the invention;

The invention is directed to a machine for applying solder to keys used for removing a rip strip from a container for opening the same. The keys are of well known construction, and each consists of a straight shank portion bent into the form of a loop at one end thereof which serves as a means for gripping the key and turning the same. This shank is provided with a slot through which the end of the rip strip is inserted.

It has been a common expedient to attach keys of this character to a container by soldering the key thereto in a way that it can be easily removed by breaking the solder bond. To facilitate the soldering of the keys to the containers it is desirable to place on the key a drop of solder before the key is placed on the container for attaching the same thereto. The present machine has to do with the placing of the solder on the tip end of the key for the purpose stated. The machine includes a series of traveling carriers each of which has a depending member with a laterally projecting tapered finger which is adapted to be inserted through the loop of the key for supporting the key. This carrier travels in an endless path and at one point in its travel it passes a loading station where the keys are automatically loaded onto these fingers of the carriers. The key is then conveyed across a tank containing a flux, and then across a tank containing solder. Associated with the carriers is a means for causing the key to dip into the flux and then into the solder so that a drop of solder is applied to the tip end of the key. Also associated with the carriers is a reversing switch which rotates the carriers so that the tapered projecting finger travels in a forward direction to assist in loading the keys onto the fingers, and in a rearward direction to assist in a removing of the keys from the fingers. When the keys are removed from the fingers they are directed into a stacking holder which may be removed from the machine.

Figure 9:
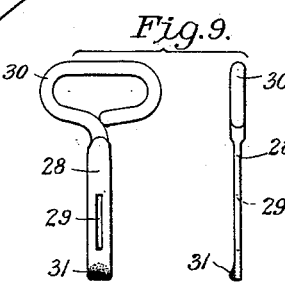
Fig. 9 is a view showing a side elevation and an edge view of one of the keys.

Referring more in detail to the drawings the machine consists of a supporting frame 1 which may be of any desired construction. The frame 1 is mounted on supporting legs 2, 2 which are firmly connected by cross braces 3. Carried by the frame 1 are brackets 4, 4 which support a circular rail 5 which is held stationary on the brackets. Centrally of the frame 1 is a bearing sleeve 6 and located in this bearing sleeve 6 is a shaft 7 carrying at its lower end a gear wheel 8 adapted to mesh with a spiral gear on a shaft 9. The shaft 9 is driven by a suitable belt pulley 10 through a connecting clutch mechanism 11 of the usual construction. Mounted on this shaft 7 is a rotating turret 12. Said rotating turret 12 consists of radial arms carrying at the outer ends thereof a circular support 13 in which the carriers are mounted. The carriers are all similar in construction and the description of one will answer for the others. The circular support 13 is provided with spaced hubs 14, 14, and there is a carrier mounted in each hub. The carrier consists of a shaft 15 mounted in a bushing 16. Attached to the upper end of the shaft is a plate 17 which overlies the hub and supports the shaft 15. This plate 17 is provided with two diametrically spaced pins 18 and 19. The shaft 15 is provided with a head 20 at the lower end thereof and on this head 20 is mounted a swinging arm 21 carrying a laterally projecting finger 22. The arm 21 is pivoted at 23 to the head 20. A spring 24 bearing on the upper face 25 of the arm normally forces the free end thereof in a downwardly direction. An adjustable stop screw 26 is provided. Said screw is carried by the arm and engages a face on the head 20 and limits the downward movement of this arm 21. The finger 22 is tapered. Its lower face is substantially horizontal and its upper face is inclined upwardly and leads to a recess 27 so disposed as to provide a retaining shoulder for the key. The key, as shown in Fig. 9, consists of a shank portion 28 which is substantially straight and which is flattened and provided with a slot 29 in which the end of the rip strip is inserted. The key is provided with a looped portion 30 which serves as a means for turning the key so as to wind the rip strip onto the shank 28. As shown in Fig. 9 the key has applied thereto a drop of solder, indicated at 31. The purpose of the present machine is to supply this solder drop to the tip end of the shank of the key. The keys are loaded on the fingers 22 by placing the loop end over the finger. The key is carried into the recess 27 and will be held on the finger until it is forcibly removed therefrom.

Figure 8:
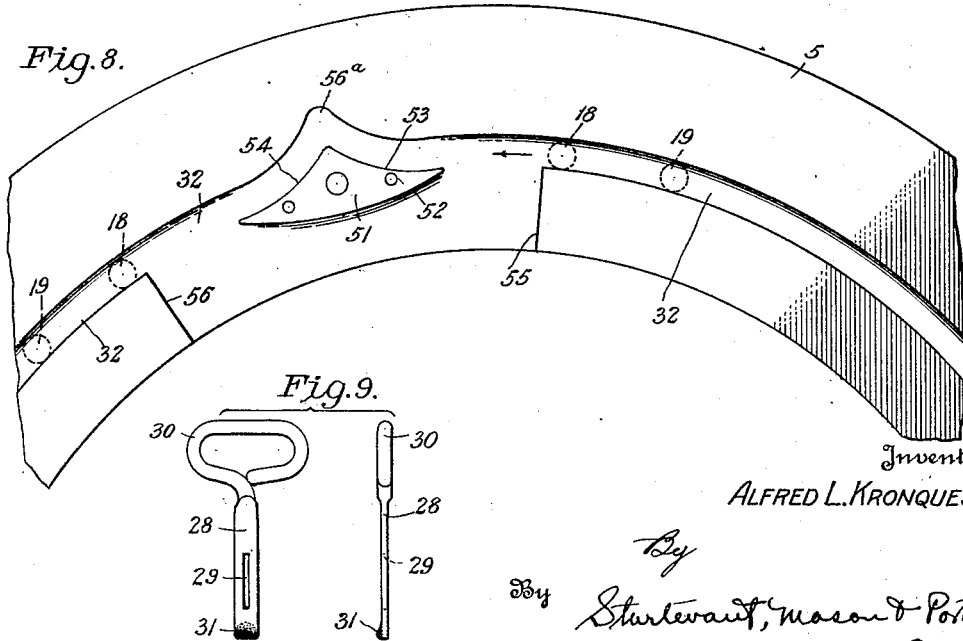
Fig. 8 is a view showing the underside of the top rail and the switch cam for reversing the position of the carrier.

The circular rail 5 carried by the brackets 4 of the frame is located directly above the path of travel of the carriers. On the under side of this rail member is a groove 32, see Fig. 8. This groove throughout a greater portion of its extent is concentric with the center of rotation of the turret. The pins 18 and 19 extend into the groove and travel along the groove. The concentric portion of the groove will prevent the carriers from rotating. These pins are so located on the carrier that when said pins are traveling in the groove the finger 22 will either project in the direction of travel of the carriers or in a direction opposite the travel of the carriers. The carriers pass a loading station where the keys are automatically placed on the fingers. At this time the fingers are pointing in a forward direction so that the finger will move into the loop and forcibly strip the key from the stack.

Figure 2:
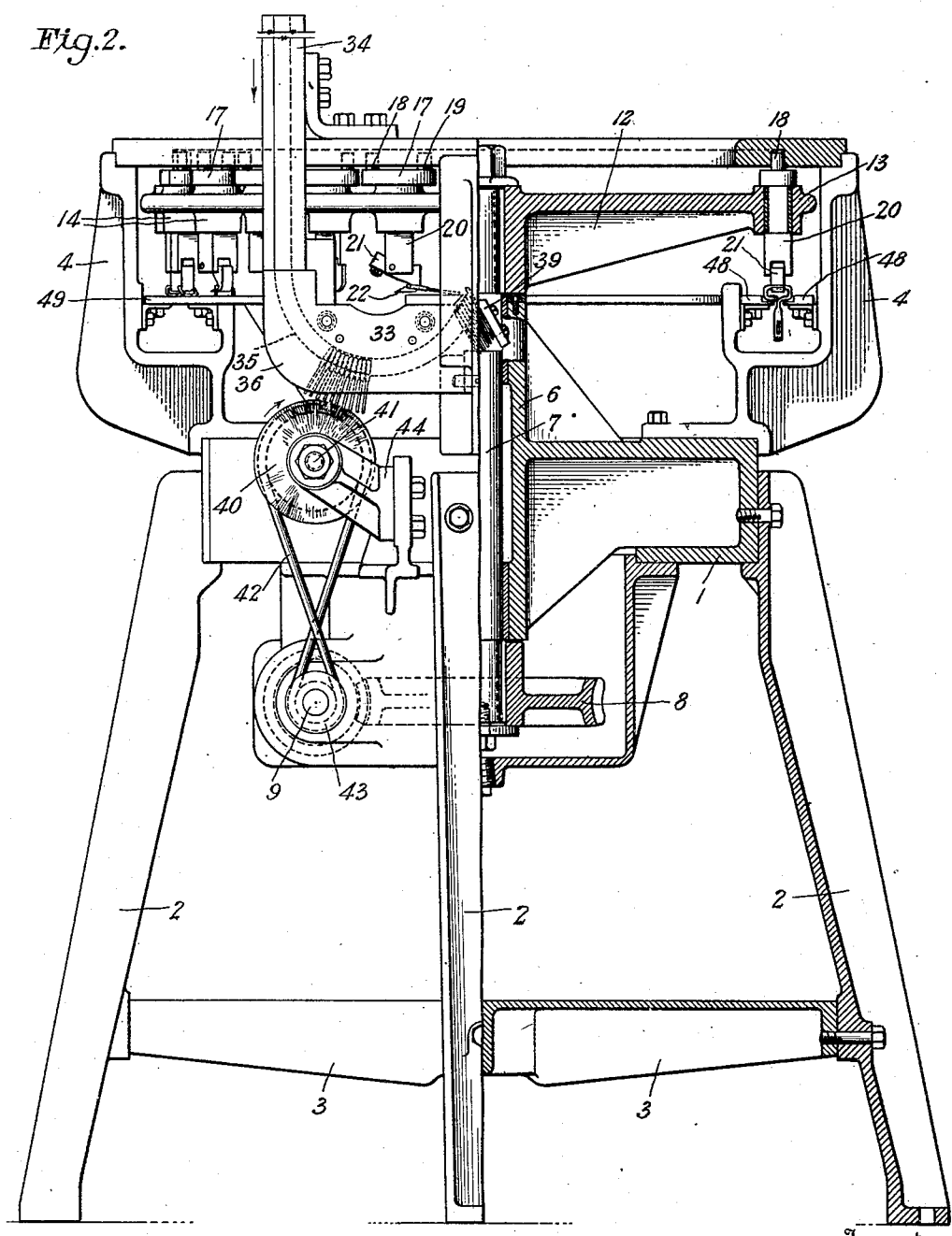
Fig. 2 is a view partly in side elevation and partly in vertical section through the same on the line 2—2 of Fig. 1.
Figure 5:
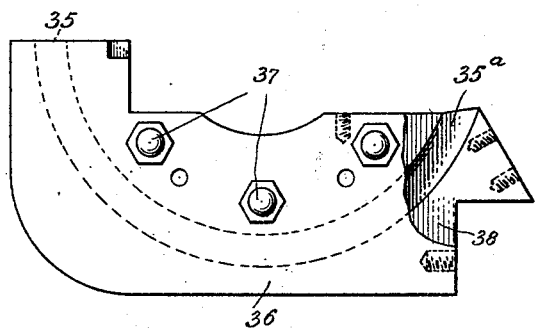
Fig. 5 is a view in side elevation showing the guideway for directing the keys onto the traveling fingers of the carriers.
Figure 6:
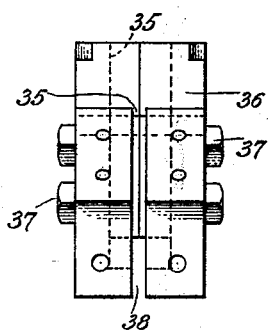
Fig. 6 is an end view of the same.
Figure 7:
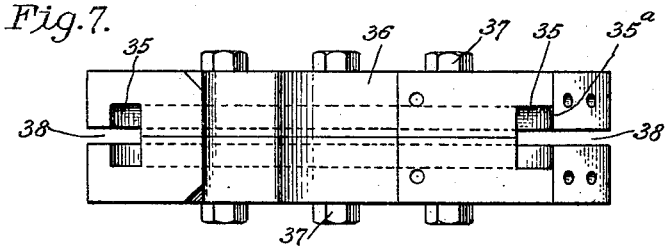
Fig. 7 is a plan view of the same.

The loading station is indicated at 33 in the drawings. The keys are placed in a stacking holder 34 in which they are retained so that they may move endwise of the holder. The keys are stacked in this holder one against the other. This holder is placed in the machine so as to feed the stacked keys into a curved channel 35 formed in a bracket 36 which is bolted to the frame of the machine. This channel is in the form of a segment of a circle, as clearly shown in Figs. 2 and 5. The bracket consists of two pieces which are bolted together. Each piece is formed with a recess so that when these two pieces are secured together by bolts 37, 37 the channel 35 is formed, and there is a slot 38 leading from this channel to the outer face of the bracket. The keys are fed into the channel so that their shanks project outwardly through the slot 38. As the stacked keys move by gravity into the channel 35 they are caused by the weight of the keys and by a feeding brush to move upwardly to the delivery end of the channel 35 which is indicated at $35^a$, Fig. 5. At the delivery end of this channel $35^a$ there is a retaining plate 39. The stacked keys are fed up against this plate 39 and will be retained with the looped end of the key projecting above the upper edge of the bracket so that as the finger of the carrier passes over the end $35^a$ of the channel the finger will enter the looped end and will forcibly pull the key from the friction grip of the stack of keys, pressing the key being removed against the retaining plate 39. The keys are fed along this channel as noted by a brush 40. The brush is mounted on a sahft 41, and rotates in the direction of the arrow, Fig. 2. The shaft 41 carries a belt wheel over which a belt 42 runs and this belt also runs over a belt wheel 43 on the shaft 9. The shaft 41 is mounted in a bracket 44. This brush is continuously rotating and is forcing the keys along the channel up against the retaining plate 39. This feeding force of the brush is of course added to the feeding force of gravity on the stacked keys when the holder 34 is filled with keys. Thus it is that the keys are loaded automatically one at a time on the passing carriers.

Figure 1:
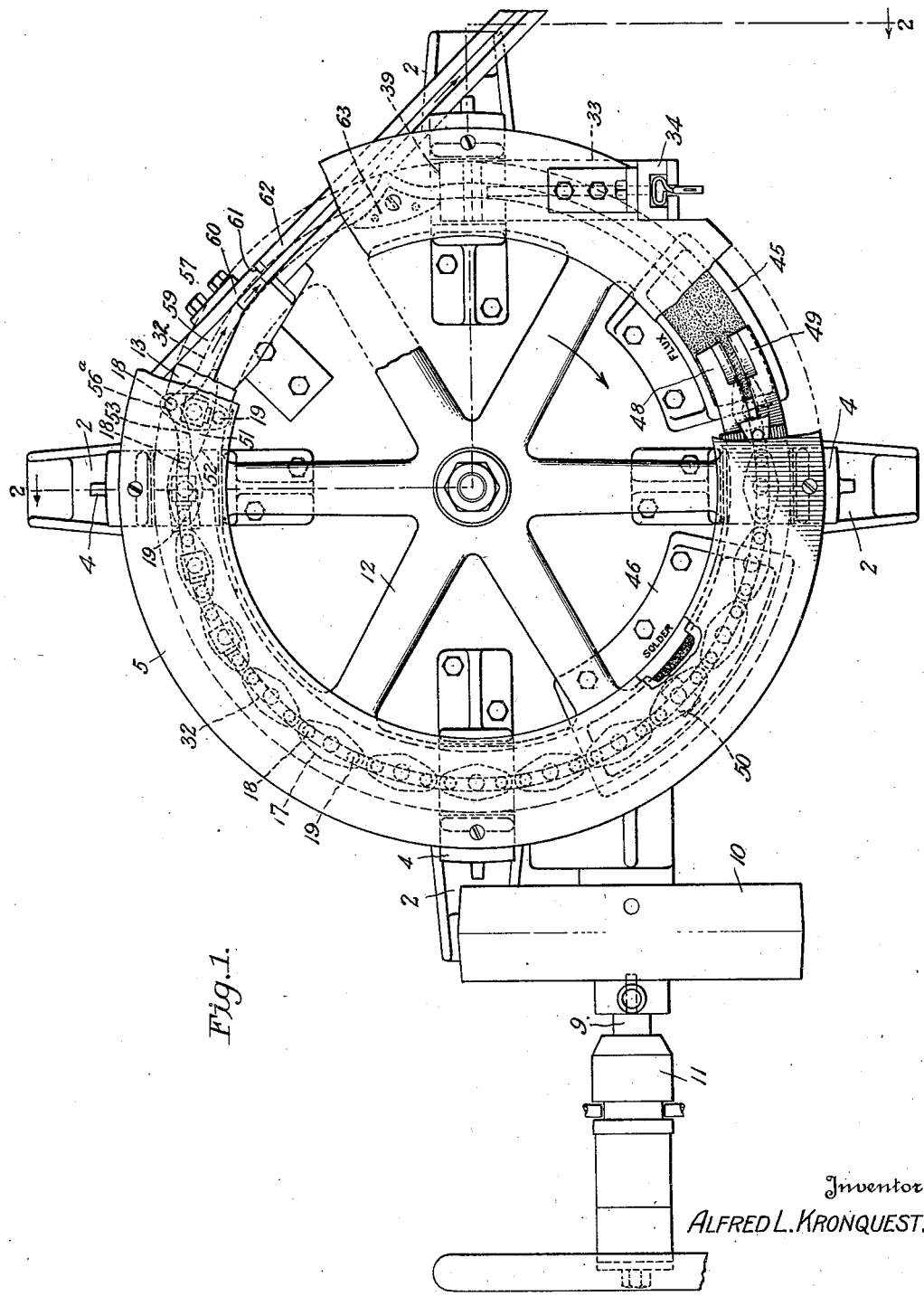
Figure 1 is a plan view of a machine embodying the improvements.
Figure 3:
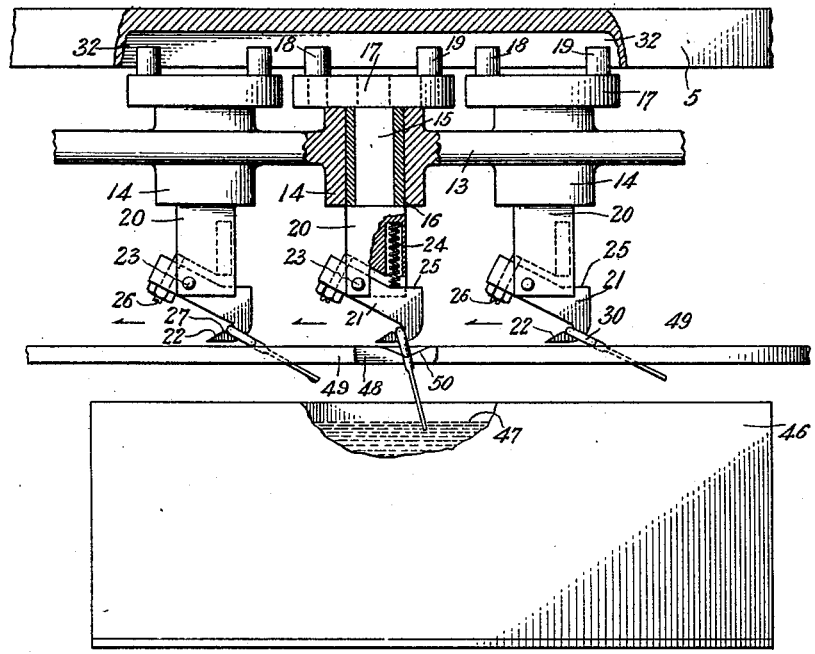
Fig. 3 is an enlarged view partly in side elevation and partly in section showing the keys passing the solder bath.

Located beneath the carriers on the frame of the machine is a fluxing tank 45 in which there is a fluxing bath. Also mounted on the frame and directly under the path of travel of the carriers is a tank 46 carrying a solder bath. This solder is kept in molten condition in any suitable way. The level of the solder in the solder bath is indicated at 47. Mounted on the frame and located directly beneath the carriers are spaced control bars 48 and 49, see Fig. 1. These control bars are spaced from each other so that the shank of the key suspended on the finger passes along the space between said control bars. The control bars are so disposed that as the keys are carried along by the fingers the shoulder at the lower side of the loop will engage the upper face of the control bars. This causes the key to take an inclined position as shown at the right in Fig. 3. The space between the control bars is only sufficient to allow a free travel of the shank of the key, and therefore the shoulder at the lower side of the loop will overlie the control bars. The distance between the finger and the control bars is less than the vertical width of the loop, and this is what causes the key suspended by the finger to take the inclined position. The control bars are cut away on their upper faces as indicated at 50 in Fig. 3 of the drawings. When the key reaches this cut-away portion the key can swing to substantially vertical position, and this will cause the tip end of the shank to dip into the solder. Just as soon as this cut-away portion is passed then the key is brought back to its inclined position free of contact with the edge of the shank as it passes by the same. There is a similar cut-away portion in the control bars directly over the fluxing bath so that the key swings down and dips into the fluxing bath as it passes over the same. After the keys have passed well beyond the solder bath the control bars terminate so that the keys are free to swing to vertical position.

Figure 4:
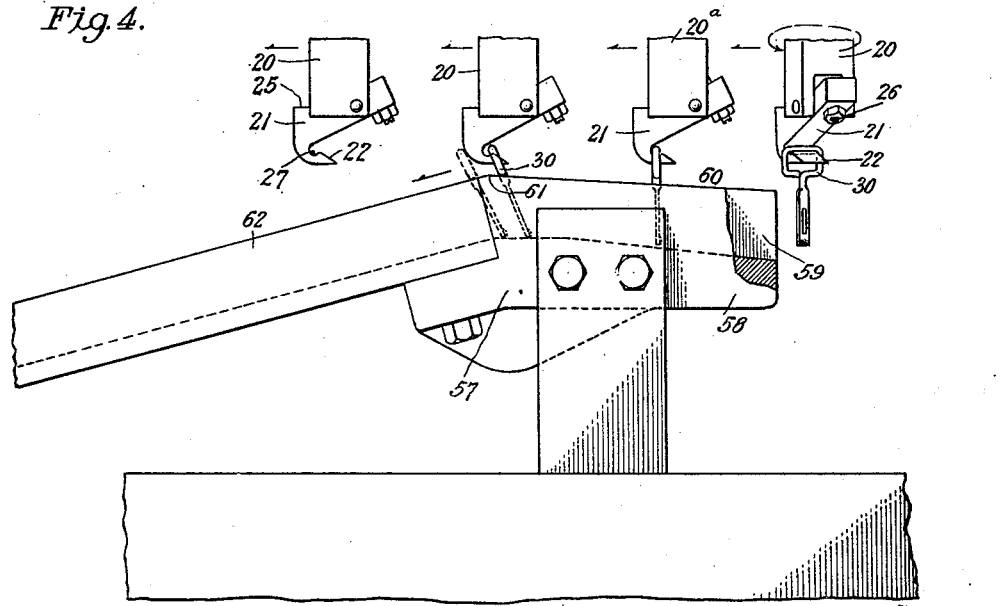
Fig. 4 is a view partly in side elevation and partly in section showing more or less diagrammatically the unloading of the keys.

A switch is provided for turning the carrier through an arc movement of 180 degrees. This switch is shown in detail in Fig. 8 of the drawings. It consists of a plate 51 having an inner curved face 52 and outer curved faces 53 and 54. The inner wall of the groove 32 is cut away from the point 55 to the point 56, and this plate 51 is located in this cut-away portion. When the carrier approaches this switch the pin 18 which is in the lead of the pin 19 will follow along the curved face 53 and this will rotate the carrier so that the pin 19 will be caused to follow along the curved face 52. When the pin 18 reaches the position 56ª in the guiding groove then the pin 19 will take the lead and will move into the groove 32 beyond the cut-away portion in advance of the pin 18. Thus it is that the carrier is rotated through an arc of 180 degrees and this causes the finger 22 to project in a direction opposite the direction of travel of the carrier. The carrier is now properly positioned for the removal of the keys from the fingers at the discharge station, which is indicated at 57 in the drawings, and is shown in detail in Fig. 4. In this figure the carrier head 20 is shown at the right as being rotated so as to cause the finger to face in a rearward direction. At the position 20ª the carrier is traveling over a stationary plate 58 having an upwardly facing channel 59 therein. The top edge 60 of the plate inclines upwardly to the left, as viewed in Fig. 4. The lower shoulder of the loop of the key will engage this inclined edge 60, and this will lift the key out of the recess 27 as it reaches the releasing point 61 and the finger will be withdrawn from the loop in the key. The discharge chute 62 is in the form of a holder for the keys, and has this same channel opening upwardly and this holder 62 inclined downwardly so that the keys will be forced into the holder and down the inclined face thereof. If the key is released from the finger before it passes the point 61 the next carrier coming along will engage the key and move it along the channel and over the high point 61, as clearly indicated in Fig. 4 of the drawings. Thus it is that the keys are automatically stripped from the fingers and delivered into this discharge chute or holder for the keys. After passing the discharge station 57, then the carriers pass through another switch 63 which is similar to the one described above, and this causes the carrier to again rotate through an arc of 180 degrees and position the fingers so that they project forwardly ready to enter the loop of the key at the loading station 33.

From the above it will be apparent that I have provided a machine which stacks keys in a holder fed automatically, and the keys are taken one after another by traveling carriers which present the keys to a fluxing bath and then a solder bath where a drop of solder is applied to the tip end of the key. After the solder has been applied to the keys they are unloaded from the carriers and again stacked in a holder which may be removed from the machine with the keys therein.

It is obvious that minor changes in the arrangement of the parts and in the details of construction may be made without departing from the spirit of the invention as set forth in the appended claims.

Having thus fully described my invention, what I claim as new and desire to secure by Letters Patent, is:—

1. A machine for applying solder to keys for containers comprising a plurality of traveling carriers having means for supporting a key, automatic means for placing a key on the supporting means of the carrier, means for applying solder to the key on the traveling carrier, and means for removing the key from the supporting means on the carrier after the solder has been applied thereto.

2. A machine for applying solder to keys for containers comprising a plurality of traveling carriers having a rotatable depending member provided with a laterally projecting finger for supporting a key, automatic means for placing the key on the finger, means for applying solder to the key while the carrier is traveling, and means for removing the key from the finger after the solder has been applied thereto.

3. A machine for applying solder to keys for containers comprising a plurality of traveling carriers having a rotatable depending member provided with a laterally projecting finger for supporting a key, automatic means for placing the key on the finger, means for applying solder to the key while the carrier is traveling, means for removing the key from the finger after the solder has been applied thereto, and means for rotating the carrier so that said finger is projecting in a forward direction when the keys are applied thereto and in a rearward direction when they are removed from the finger.

4. A machine for applying solder to keys for containers comprising a plurality of traveling carriers having a rotatable depending member provided with a laterally projecting finger for supporting a key, automatic means for placing the key on the finger, means for applying solder to the key while the carrier is traveling, and means for removing the key from the finger after the solder has been applied thereto, each finger having its upper face tapered and terminating in a recess providing a shoulder for holding the key on the finger.

5. A machine for applying solder to keys for containers comprising a plurality of traveling carriers having a rotatable depending member provided with a laterally projecting finger for supporting a key, automatic means for placing the key on the finger, means for applying solder to the key while the carrier is traveling, means for removing the key from the finger after the solder has been applied thereto, and stationary means cooperating with the carriers for rotating the same so that the finger points in a forward direction when entering the loop of the key and in a rearward direction when the key is removed from the finger.

6. A machine for applying solder to keys for containers comprising a plurality of traveling carriers having a rotatable depending member provided with a laterally projecting finger for supporting a key, automatic means for placing the key on the finger, means for applying solder to the key while the carrier is traveling, means for removing the key from the finger after the solder has been applied thereto, and a stationary member located above the path of travel of the carriers, each carrier having diametrically opposed pins adapted to travel in a groove in said member, said groove operating to hold said carrier from rotating, said member having a switch for rotating the carrier through an arc of 180 degrees after the solder has been applied to the keys for positioning the finger in a rearward direction to aid in the removal of the key therefrom.

7. A machine for applying solder to keys for containers comprising a plurality of traveling carriers having means for supporting a key, automatic means for placing a key on the supporting means of a carrier, means for applying solder to the key on the traveling carrier, means for removing the key from the carrier after the solder has been applied thereto, said automatic means for placing the keys including a holder for the stack of keys, a supporting bracket having a guiding channel to receive the keys, said channel being curved in an upward direction in the delivery end thereof, and a retaining means at the delivery end for positioning the key so that it may be received by the key supporting means on the carrier.

8. A machine for applying solder to keys for containers comprising a plurality of traveling carriers having means for supporting a key, automatic means for placing a key on the supporting means of a carrier, means for applying solder to the key on the traveling carrier, means for removing the key from the carrier after the solder has been applied thereto, said automatic means for placing the keys including a holder for the stack of keys, a supporting bracket having a guiding channel to receive the keys, said channel being curved in an upward direction in the delivery end thereof, a retaining means at the delivery end for positioning the key so that it may be received by the key supporting means on the carrier, and a rotating brush for moving the keys along the guiding channel in the bracket.

9. A machine for applying solder to keys for containers comprising a plurality of traveling carriers having means for supporting a key, automatic means for placing a key on the supporting means of a carrier, means for applying solder to the key on the traveling carrier, means for removing the key from the carrier after the solder has been applied thereto, said means for removing the keys from the carrier including a member having an inclined face adapted to engage the key and lift the same from the finger, and a stacking rail associated with said member to receive the keys.

10. A machine for applying solder to keys for containers comprising a plurality of rotatable traveling carriers each having a depending member provided with a laterally projecting retaining finger, means for rotating said carrier so that the finger projects in a forward direction for loading, means for automatically placing the keys in succession on said fingers including a key holder for stacked keys, a support having a channel receiving the keys from the holder, said channel being curved upwardly at the delivery end thereof, and a retaining plate at the delivery end for positioning the keys so that the finger will enter the loop of the key, means for applying solder to the keys during the travel of the carriers, and means for rotating the carrier so that the finger projects rearwardly after the solder has been applied to the key.

11. A machine for applying solder to keys for containers comprising a plurality of rotatable traveling carriers each having a depending member provided with a laterally projecting retaining finger, means for rotating said carrier so that the finger projects in a forward direction for loading, means for automatically placing the keys in succession on said fingers including a key holder for stacked keys, a support having a channel receiving the keys from the holder, said channel being curved upwardly at the delivery end thereof, a retaining plate at the delivery end for positioning the keys so that the finger will enter the loop of the key, and a brush associated with said member and engaging the keys for forcing the same along the channel, means for applying solder to the keys during the travel of the carriers, and means for rotating the carrier so that the finger projects rearwardly after the solder has been applied thereto.

12. A machine for applying solder to keys for containers comprising a plurality of rotatable traveling carriers each having a depending member provided with a laterally projecting retaining finger, means for rotating said carrier so that the finger projects in a forward direction for loading, means for automatically placing the keys in succession on said fingers including a key holder for stacked keys, a support having a channel receiving the keys from the holder, said channel being curved upwardly at the delivery end thereof, a retaining plate at the delivery end for positioning the keys so that the finger will enter the loop of the key, a member having an inclined upper face for engaging and lifting the keys from the fingers, and a stacking rail for receiving the keys from said inclined face, means for applying solder to the keys during the travel of the carriers, and means for rotating the carrier so that the finger projects rearwardly after the solder has been applied to the key.

13. A machine for applying solder to keys for containers comprising a plurality of rotatable traveling carriers each having a depending member provided with a laterally projecting retaining finger, means for rotating said carrier so that the finger projects in a forward direction for loading, means for automatically placing the keys in succession on said fingers including a key holder for stacked keys, a support having a channel receiving the keys from the holder, said channel being curved upwardly at the delivery end thereof, a retaining plate at the delivery end for positioning the keys so that the finger will enter the loop of the key, a member disposed above the traveling carriers and having a groove in the underface thereof, each carrier having diametrically opposed pins adapted to engage said groove, a switch carried by said plate for rotating said carrier to position the finger so that it projects forwardly at the proper time, and a switch carried by said plate for rotating said carrier so as to cause said finger to project rearwardly at the proper time and means for applying solder to the keys during the travel of the carriers.

14. A machine for applying solder to keys for containers comprising a plurality of traveling carriers, a solder bath over which the carriers pass, each carrier having a supporting means adapted to engage the loop of a key, and control bars associated with the carriers in the region of the solder bath and operating upon said keys to turn the keys to an inclined position whereby they may be passed over the edge of the tank containing the solder bath, said control bars being shaped so as to allow the key to swing to vertical position for dipping the end thereof into the solder.

15. A machine for applying solder to keys for containers comprising a plurality of traveling carriers each having a depending member provided with a laterally projecting finger adapted to enter the loop of a key and support the key, a solder bath over which said carriers pass, and control bars in the region of the solder bath for engaging the shoulders at the loop of the key for turning said keys to inclined position on the supporting fingers as the keys pass over the edges of the tank containing the solder bath, said control bars being shaped so as to permit the key to swing to vertical position and dip into the solder bath while passing across the same.

In testimony whereof, I affix my signature.

ALFRED L. KRONQUEST.